United States Patent
Peters

(10) Patent No.: US 9,308,837 B2
(45) Date of Patent: Apr. 12, 2016

(54) FITTING FOR A VEHICLE SEAT

(75) Inventor: Christoph Peters, Wermelskirchen (DE)

(73) Assignee: KEIPER GMBH & CO. KG, Kaiserslautern (DE)

(*) Notice: Subject to any disclaimer, the term of this patent is extended or adjusted under 35 U.S.C. 154(b) by 306 days.

(21) Appl. No.: 13/990,894

(22) PCT Filed: Nov. 25, 2011

(86) PCT No.: PCT/EP2011/005930
§ 371 (c)(1),
(2), (4) Date: Jul. 26, 2013

(87) PCT Pub. No.: WO2012/072216
PCT Pub. Date: Jun. 7, 2012

(65) Prior Publication Data
US 2013/0300175 A1 Nov. 14, 2013

(30) Foreign Application Priority Data
Dec. 1, 2010 (DE) .......................... 10 2010 053 525

(51) Int. Cl.
*B60N 2/235* (2006.01)
*B60N 2/433* (2006.01)

(52) U.S. Cl.
CPC .............. *B60N 2/2356* (2013.01); *B60N 2/433* (2013.01)

(58) Field of Classification Search
CPC ............................. B60N 2/2356; B60N 2/433
USPC .......................................... 297/367 R, 367 P
See application file for complete search history.

(56) References Cited

U.S. PATENT DOCUMENTS 7,563,049 B2 * 7/2009 Peters .................... 403/97 X
2003/0025377 A1 * 2/2003 Peters ..................... 297/367

FOREIGN PATENT DOCUMENTS

| DE | 102005 46 807 B3 | 11/2006 |
| DE | 102005 46 806 B3 | 4/2007 |
| DE | 102006 15 560 B3 | 8/2007 |
| EP | 1 195 115 A1 | 4/2002 |
| EP | 1 806 072 B1 | 7/2007 |
| JP | 2006-288741 A | 10/2006 |
| JP | 2009-509596 A | 3/2009 |
| WO | WO 2010020047 A1 * | 2/2010 |

OTHER PUBLICATIONS

International Preliminary Report on Patentability for International Application No. PCT/EP2011/005930 dated Jun. 13, 2013, 11 pages.

(Continued)

*Primary Examiner* — Anthony D Barfield
(74) *Attorney, Agent, or Firm* — Foley & Lardner LLP

(57) ABSTRACT

A fitting for a vehicle seat includes a first fitting part and a second fitting part, which can be rotated relative to each other, bolts which, in the locked state, interact with a toothed ring on the first fitting part to lock the fitting, and a rotatably mounted eccentric, which acts on the bolts when changing from the unlocked state to the locked state by rotation in a closing direction. When in the locked state without any external torque, a first eccentric cam and a first locking cam are in contact with each other at a first contact point and there is a gap between the second eccentric cam and a second locking cam. Starting at a specific external torque, the second eccentric cam and the second locking cam are in contact with each other at a second contact point.

15 Claims, 3 Drawing Sheets

(56) References Cited

OTHER PUBLICATIONS

International Search Report in PCT/EP2011/005930 dated Feb. 13, 2012.

Office Action dated Mar. 11, 2014, in corresponding Japanese Application No. 2013-527503 and English translation, 4 pages.

* cited by examiner

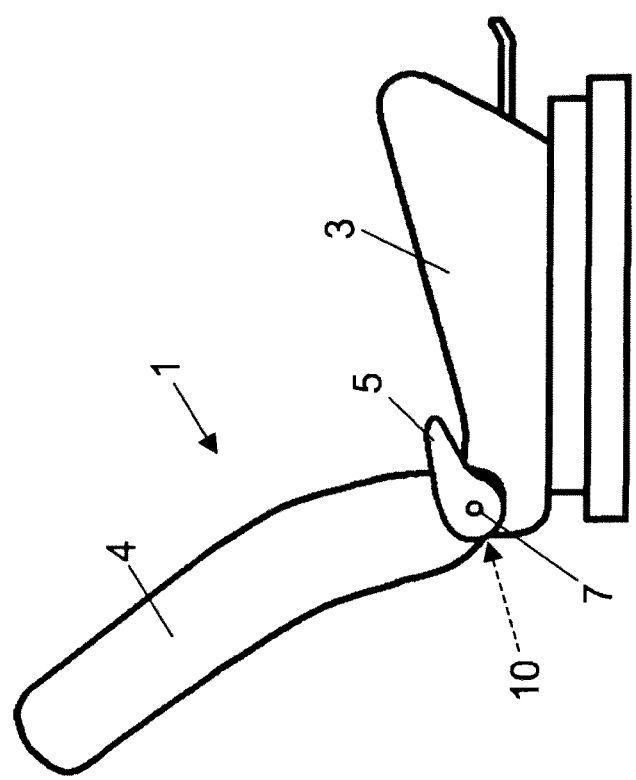
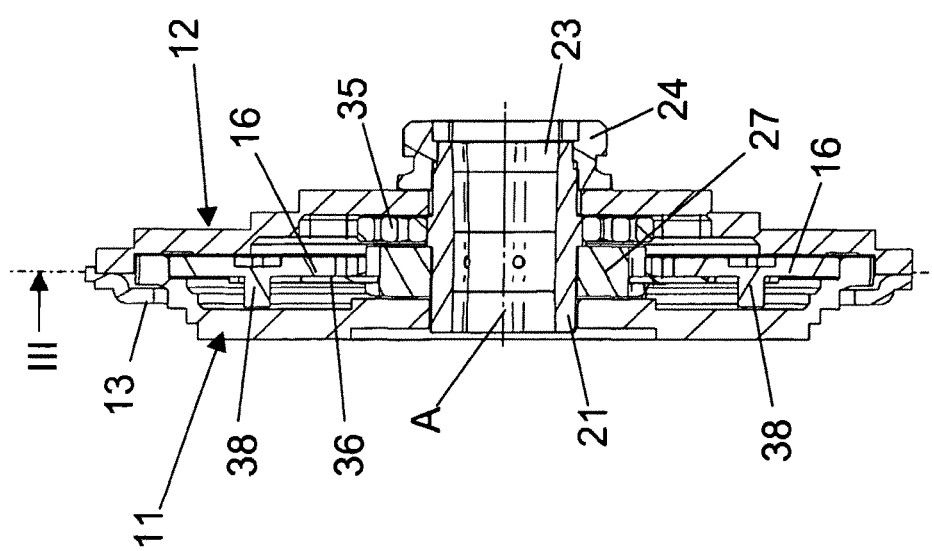

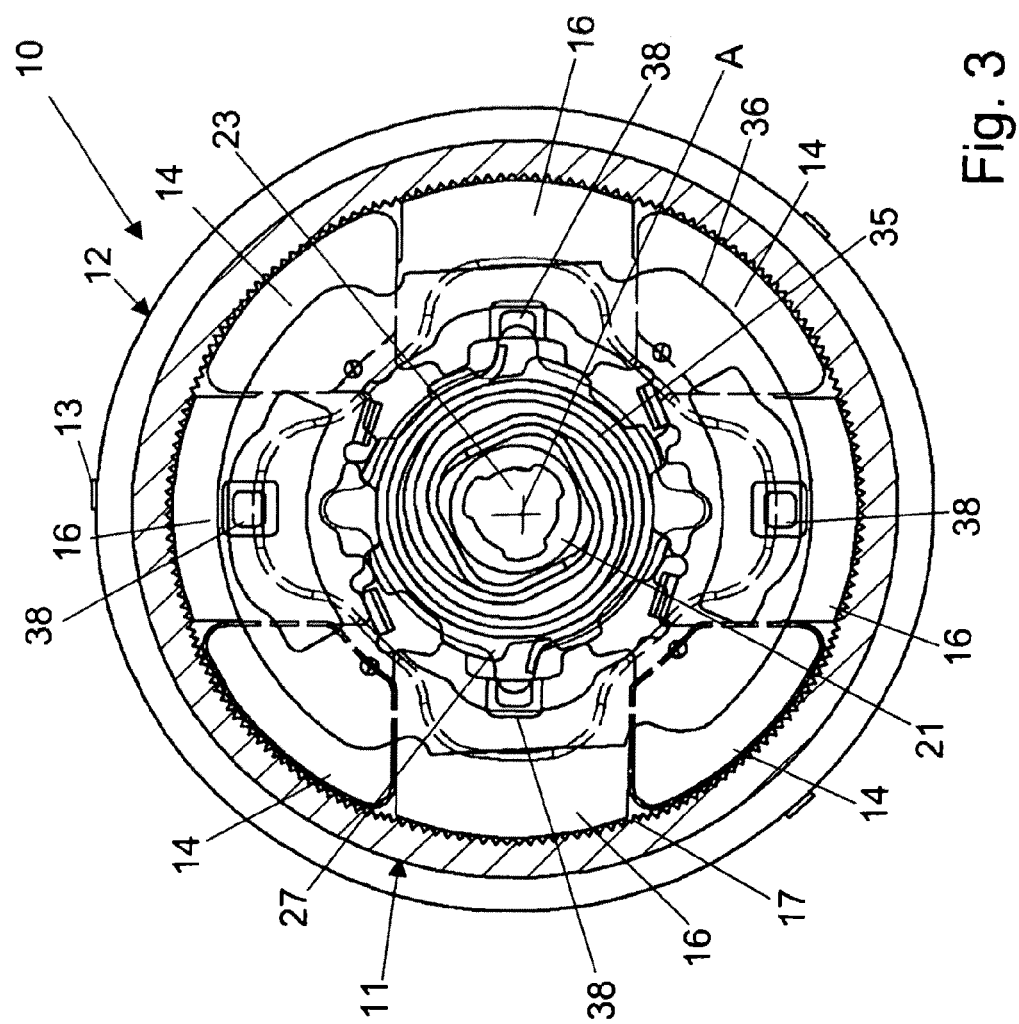

FITTING FOR A VEHICLE SEAT

CROSS REFERENCE TO RELATED APPLICATIONS

The present application is a National Stage of International Application No. PCT/EP2011/005930 filed on Nov. 25, 2011, which claims the benefit of German Patent Application No. 10 2010 053 525.7 filed on Dec. 1, 2010, the entire disclosures of which are incorporated herein by reference.

The invention relates to a fitting for a vehicle seat having the features of the preamble of claim 1.

A fitting of this type is known from EP1195115 B1. In the locked state, the eccentric acts on the two locking cams of the two bars with both eccentric cams. The wedge angle at the cam pair following in the closure direction is negative.

EP1806072 B1 describes a fitting whose eccentric has three eccentric cams, and the two bars accordingly have three locking cams. The cams of the central cam pair are in contact with each other in the locked state and have a negative wedge angle. In the leading cam pair there is a gap, which is also the case with the following cam pair. In the case of an external torque, a gap disappears. The pair of cams which come into contact with each other may co-operate in two different manners since the eccentric cam has two different wedge angles, whilst the locking cam has two convex regions which are separated from each other by means of a concave intermediate region.

In order to increase the strength of a fitting, with at the same time tolerance compensation of the play between the bar and bar guide, it is proposed in DE 10 2005 046 806 B3 that each bar with the fitting locked can be tilted within the bar guides in the opposite direction to the bars which are adjacent in each case.

With a fitting disclosed in DE 10 2005 046 807 B3, the spring arrangement which acts on the eccentric has two springs which are fitted one inside the other and which act counter to opening of the fitting. However, such a spring arrangement is complex to assemble and adds considerable additional weight in comparison with a spring arrangement having only one spring.

An object of the invention is to improve a fitting of the type mentioned in the introduction. This object is achieved as claimed in the invention with a fitting having the features of claim 1. Advantageous embodiments are set out in the dependent claims.

The positive wedge angle at the first cam pair serves to lock the bar and to compensate for tolerance. The normal force with an opening component is compensated for in a self-locking manner by the friction forces. The negative wedge angle at the second cam pair serves to lock the rotation of the eccentric under load. The normal force has a closing component. In the locked state, the first eccentric cam abuts the first locking cam. Without any external torque on the backrest, however, there is a gap between the second eccentric cam and the second locking cam. Only from a specific external torque on the backrest do the second eccentric cam and the second locking cam come into contact with each other at a second contact location. Depending on the load direction on the backrest, it is advantageous for the first eccentric cam to be either leading or following in the closure direction of the eccentric.

The invention is not limited to a specific number of bars. Preferably, the number of bars is two, three or four bars. In fittings having a plurality of bars, the strength of the fitting can be further optimized by one of the two bars from two adjacent bars having a first eccentric cam which leads in the closure direction and the other of the two bars having a first eccentric cam which follows in the closure direction. The load increasing effect described can thus be used in an optimal manner for both load directions acting on the backrest (in and counter to the travel direction). In fittings with an even number of bars, two radially opposing bars may also be constructed in such a manner that one of the two opposing bars has a first eccentric cam which leads in the closure direction and the other of the two bars has a first eccentric cam which follows in the closure direction.

The invention is explained in greater detail below with reference to an embodiment illustrated in the drawing, in which:

FIG. 2 is an axial section through the embodiment,

FIG. 3 is a radial section through the embodiment along the line in FIG. 2, and FIG. 4 is a schematic illustration of a vehicle seat.

Figure 1:
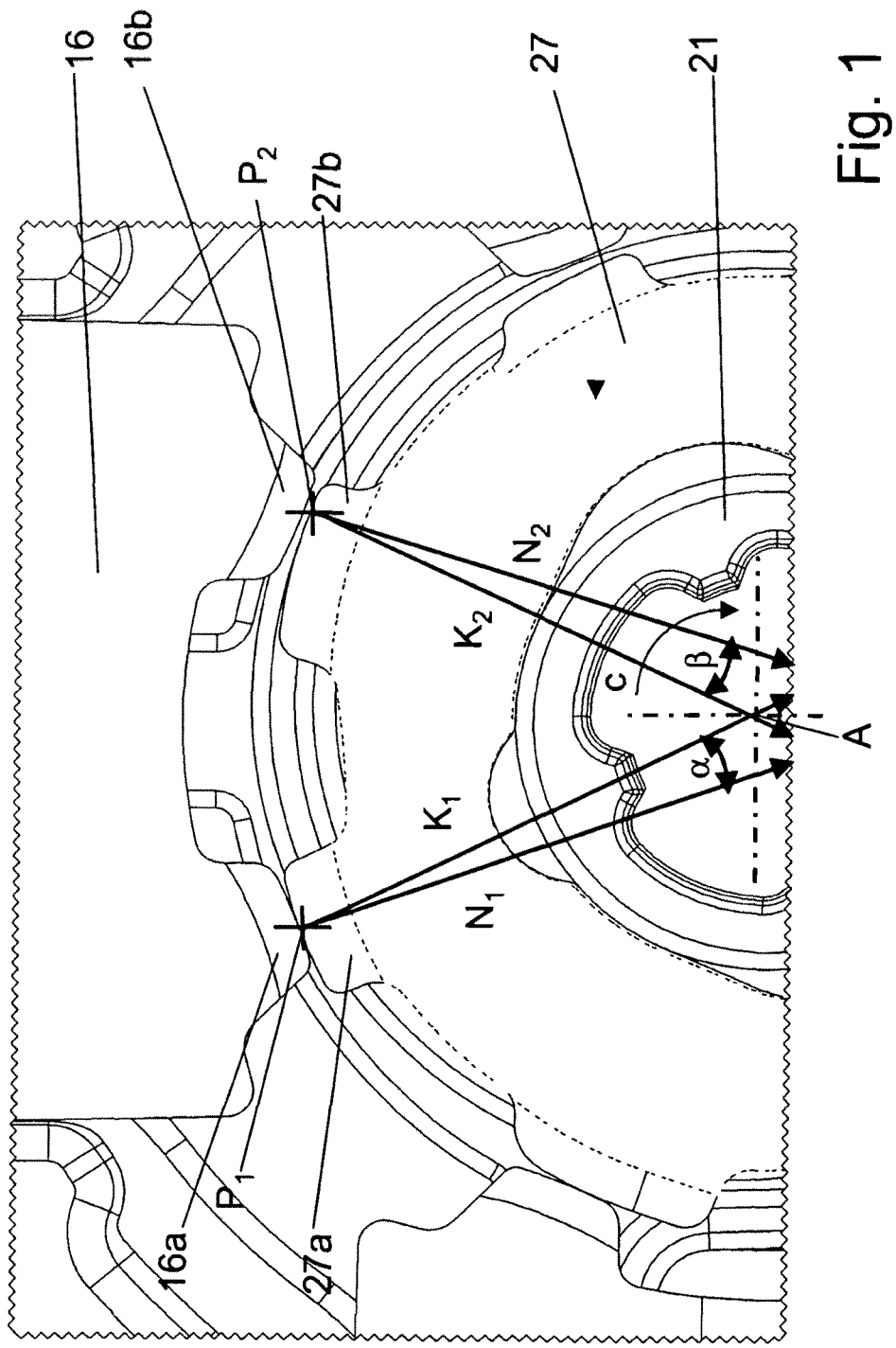
FIG. 1 is a partial view in the region between the eccentric and a bar.

A vehicle seat 1 for a motor vehicle has a seat member 3 and a backrest 4 which can be adjusted in terms of its inclination relative to the seat member 3. In order to adjust the inclination of the backrest 4, there is manually rotated, for example by means of a hand-operated lever 5, a transmission rod 7 which is arranged horizontally in the transition region between the seat member 3 and backrest 4. At both sides of the vehicle seat 1, the transmission rod 7 engages in a fitting 10. The transmission rod 7 defines the used directional indications of a cylindrical co-ordinate system.

The fitting 10 has a first fitting member 11 and a second fitting member 12 which can be rotated relative to each other about an axis A. The (notional) axis A is in alignment in this instance with the transmission rod 7. The two fitting members 11 and 12 can each be inscribed approximately in a circular disk form. Both fitting members 11 and 12 preferably comprise metal, in particular steel, which can be at least partially hardened. In order to receive the axially acting forces, that is to say, in order to axially hold together the fitting members 11 and 12, a gripping ring 13 is provided. The gripping ring 13 preferably comprises metal, in particular steel, which is preferably non-hardened. The gripping ring 13 preferably has a substantially planar annular form but may in an alternative embodiment be profiled in an L-shaped manner having a cylindrical portion and, at the end face, a planar annular portion.

The gripping ring 13 is securely connected to one of the two fitting members 11 and 12, in this case in an external annular portion to the second fitting member 12, for example by means of laser welding or by means of another fixing technique known per se. By means of an internal annular portion which is arranged in a plane perpendicular relative to the axial direction, the gripping ring 13, optionally with a sliding ring being interposed, engages over the first fitting member 11 in the radially external edge region thereof, without impeding the relative movement of the two fitting members 11 and 12. In addition, the mutually facing inner faces of the two fitting members 11 and 12 are protected from the introduction of foreign bodies and contamination and damage.

The gripping ring 13 and the fitting member 11 or 12 which is securely connected thereto therefore grip the other of the two fitting members 11 and 12 that can be moved relative thereto. From a structural viewpoint, the two fitting members 11 and 12 therefore together form (with the gripping ring 13) a disk-like unit.

With the assembly of the fitting 10, the first fitting member 11 is, for example, securely connected to the structure of the backrest 4, that is to say, secured to the backrest. The second fitting member 12 is then securely connected to the structure of the seat member 3, that is to say, secured to the seat member. However, the associations of the fitting members 11 and 12 may also be transposed, that is to say, the first fitting member 11 would then be secured to the seat member and the second fitting member 12 would be secured to the backrest. The fitting 10 is located in the force path between the backrest 4 and seat member 3.

The fitting 10 is constructed as a catch fitting in which the first fitting member 11 and the second fitting member 12 can be locked together, as described, for example, in DE 10 2006 015 560 B3 whose disclosure is expressly incorporated herein by reference.

The second fitting member 12 has—in this instance four— guiding segments 14 which guide in pairs a bar 16 laterally in a radial direction with straight guiding faces. The bars 16—in this instance a total of four bars 16—are arranged in a state offset—in this instance through 90°—relative to each other in a structural space defined between the two fitting members 11 and 12. The bars 16 are provided at the radially outer end thereof with a tooth arrangement, which may move (fall) into engagement with a toothed ring 17 of the first fitting member 11 which is constructed as an internally toothed wheel. When the toothed ring 17 and the bars 16 co-operate, the fitting 10 is locked. In an alternative configuration, the number of bars is one, two, three or more than four bars.

The first fitting member 11 is arranged in a recess of the second fitting member 12 and is overlapped thereby in a radially outward direction, whereby the two fitting members 11 and 12 support each other. In this instance, the radially outer edge region of the first fitting member 11 is arranged with the toothed ring 17 in a radial direction between the guiding segments 14 and the radially outer edge region (which serves to support the first fitting member 11) of the second fitting member 12. With high loads, for example in the event of a crash, the first fitting member 11—after deformation—may move with its toothed ring 17 into abutment with the guiding segments 14 which are closer in the load direction and which have correspondingly (concentrically) curved faces in the direction towards the toothed ring 17. This increases the strength of the fitting 10.

The first fitting member 11 may be supported in the second fitting member 12. However, the relationships could be precisely transposed, that is to say, the second fitting member 12 may be supported on the first fitting member 11. In principle, however, both arrangements are equally advantageous.

There is arranged at the center of the fitting 10 a carrier 21 which comprises, for example, plastics material and which is rotatably supported on at least one of the two fitting members 11 and 12, in this instance the first fitting member 11, more precisely in a central opening thereof. At both vehicle seat sides, the carrier 21 is connected in a rotationally secure manner or at least coupled for joint movement with the transmission rod 7 which is introduced into a hole 23 of the hollow carrier 21 and on which the hand-operated lever 5 rests in a rotationally secure manner. At one end of the carrier 21, in the present case the one on the second fitting member 12, there is provided a securing ring 24 which comprises plastics material in this instance and which is preferably secured to the carrier 21 by means of ultrasound welding. The hand-operated lever 5 may be securely clipped to the securing ring 24 in a rotationally secure manner. The securing ring 24 may also be provided at the other end of the carrier 21 or be provided at both ends, respectively.

There rests on the carrier 21 in a rotationally secure manner or at least in a manner coupled for joint movement an eccentric 27, which is arranged in the structural space defined between the fitting members 11 and 12. The eccentric 27 has along the outer periphery thereof for each bar 16, that is to say, in this case, four-fold, a first eccentric cam 27a which is provided for co-operation with a first locking cam 16a and— offset in a peripheral direction relative thereto—a second eccentric cam 27b which is provided for co-operation with a second locking cam 16b. The eccentric cams 27a and 27b are directed radially outwards and the locking cams 16a and 16b are directed radially inwards from the respective bar 16.

A spring arrangement 35, for example one or two helical springs which are fitted one inside the other, is arranged in a central receiving member of one of the two fitting members 11 and 12, in this instance of the second fitting member 12, and in this instance supported at the outer side. The spring arrangement 35 acts on the eccentric 27, in this instance by being supported at the inner side on the carrier 21 in a rotationally secure manner. Such a spring arrangement 35 is described, for example, in DE 10 2005 046 807 B3, whose disclosure is expressly incorporated herein by reference. The eccentric 27 acted on by the spring arrangement 35 acts on the radially movable bars 16 and acts thereon in such a manner that they are pressed radially outwards in order to fall into the toothed ring 17, whereby the fitting 10 is locked.

A control cam 36 is arranged in the structural space axially between the bars 16 and the first fitting member 11 and rests in this instance on the eccentric 27 in a rotationally secure manner. The control cam 36 has—in this instance four— control paths which each co-operate with a projection 38 of each bar 16. The projections 38 protrude in an axial direction from the bars 16 which are associated therewith. During rotation (by a few degrees) of the carrier 21—and the eccentric 27, which is driven thereby, and the control cam 36—counter to the force of the spring arrangement 35, the control cam 36 pulls the bars 16 radially inwards, that is to say, out of the toothed ring 17, whereby the fitting 10 is unlocked and the two fitting members 11 and 12 can be pivoted relative to each other about the axis A. The backrest 4 can now be pivoted about the axis A in order to adjust the inclination thereof, that is to say, in order to assume another position for use.

The closure direction of the eccentric 27 is the rotation direction of the eccentric 27 which acts in a closing manner owing to the action by the spring arrangement 35. The co-operation of the eccentric 27 with one of the bars 16 is considered below, the closure direction being in the clockwise direction in FIG. 1, and the first eccentric cam 27a following in the closure direction and the second eccentric cam 27b leading in the closure direction.

In the locked state without loading of the backrest 4 (that is to say, without any external torque and only with the torque brought about by the weight of the backrest 4), the eccentric 27 acts only by means of the first eccentric cam 27a thereof on the associated first locking cams 16a, to be precise at a first contact location P1 (at which the first eccentric cam 27a and the first locking cam 16a are in contact with each other), whilst, between the second eccentric cam 27b and the associated second locking cam 16b, there is a gap of from approximately 0.05 to 0.5 mm, preferably approximately 0.25 mm. The resultant forces K1 at the first four contact locations P1 in each case extend through the center point of the fitting 10, that is to say, through the axis A, so that they generally neutralize each other. In the first contact location P1, the first eccentric cam 27a and the associated first locking cam 16a touch each other, that is to say, with the same pitch and a common tangent. The normal force N1 at the first contact location P1, which is directed radially inwards perpendicularly relative to this tangent, is at an angle relative to the resultant force K1 which is referred to as a first wedge angle α and which at the same time corresponds to the angle between the tangent at the first contact location P1 and the circular arc about the axis A through the first contact location P1.

The closure direction c determines how the first wedge angle α is measured. The first wedge angle α is positive, that is to say, when viewed in the figures, the following regions of the first eccentric cam 27a in the closure direction c protrude radially further outwards than the leading regions so that the bar 16 which is acted on by the first eccentric cam 27a is locked and tolerance compensation is possible. The normal force N1 at the first contact location P1 acts in an opening manner, but is compensated for in a self-locking manner by the friction so that said resultant force K1 is produced. As claimed in the invention, the first wedge angle α is smaller than 5.7°, preferably smaller than 4.5°. The first eccentric cam 27a and the first locking cam 16a are material portions which are constructed in a convex manner, at least generally in the region in which the first contact location P1 may be located.

If, in the locked state, a load acts on the backrest 4, this torque attempts to rotate the toothed ring 17 relative to the guiding segments 14. The bars 16 are guided with play between the guiding segments 14 and are on the one hand in engagement with the toothed ring 17 and on the other hand supported on the associated first eccentric cam 27a. The torque on the backrest 4 therefore tilts the bars 16. When the torque in the drawing acts in a counter-clockwise direction, the bar 16 tilts to the left (and contacts the left-hand guiding segment 14) and the resultant force at the first contact location P1 increases. When the torque acts on the backrest 4 in a clockwise direction in the drawing, the bar 16 tilts to the right (and contacts the right-hand guiding segment 14). When the torque on the backrest 4 is sufficiently great, for example more than 100 Nm, the second eccentric cam 27b and the second locking cam 16b come into contact with each other at a second contact location P2.

The resultant forces K2 at the four second contact locations P2 also extend through the center point of the fitting 10, that is to say, through the axis A, so that they generally neutralize each other. At the second contact location P2, the second eccentric cam 27b and the associated second locking cam 16b touch each other, that is to say, with the same pitch and a common tangent. The normal force N2 at the second contact location P2, which is directed radially inwards perpendicularly relative to this tangent, is at an angle with respect to the resultant force K2 which is referred to as a second wedge angle β, and at the same time corresponds to the angle between the tangent at the second contact location P2 and the circular arc about the axis A through the second contact location P2. The second wedge angle β is negative, that is to say, when viewed in the figures, the regions of the second locking cam 16b located counter to the closure direction c protrude radially further inwards than the regions located further in the closure direction c. Any rotation of the eccentric 27 counter to the closure direction c is thus blocked. The normal force N2 at the second contact location P2 therefore acts in a closing manner, but is compensated for in a self-locking manner by the friction, so that said resultant force K2 is produced. As claimed in the invention, the second wedge angle β has a value smaller than 5.7°, preferably smaller than 4.5°. The second eccentric cam 27b and the second locking cam 16b are material portions which are constructed in a convex manner, at least generally in the region in which the second contact location P2 may be located.

At the diagonally opposing bar 16, the situation is preferably as described above. With the bars 16 which are arranged in an adjacent manner therebetween, depending on the desired configuration of the fitting 10, the same situation or the situation which is mirror-inverted with respect to the closure direction c may arise, that is to say, those bars 16 tilt in opposing directions and the associated first eccentric cams lead in the closure direction c.

LIST OF REFERENCE SYMBOLS

1 Vehicle seat
3 Seat member
4 Backrest
5 Hand-operated lever
7 Transmission rod
10 Fitting
11 First fitting member
12 Second fitting member
13 Gripping ring
14 Guiding segment
16 Bar
16a First locking cam
16b Second locking cam
17 Toothed ring
21 Carrier
23 Hole
24 Securing ring
27 Eccentric
27a First eccentric cam
27b Second eccentric cam
35 Spring arrangement
36 Control cam
38 Projection
A Axis
c Closure direction
K1 Resultant force at the first contact location
K2 Resultant force at the second contact location
N1 Normal force at the first contact location
N2 Normal force at the second contact location
P1 First contact location
P2 Second contact location
α First wedge angle
β Second wedge angle

The invention claimed is:

1. A fitting for a vehicle seat having a backrest, the fitting comprising:
   a first fitting member and a second fitting member, which can be pivoted relative to each other about an axis, a toothed ring being constructed on the first fitting member and guiding segments being constructed on the second fitting member;
   at least one bar which can be radially displaced by the guiding segments in a guided manner between a locked state and an unlocked state, and which in the locked state co-operates with the toothed ring in order to lock the fitting, the at least one bar having a first locking cam and a second locking cam and no additional locking cams; and
   a rotatably supported eccentric which, during movement from the unlocked state to the locked state by rotation in a closure direction, acts on the bar, the eccentric having for the at least one bar precisely one first eccentric cam which is suitable for co-operation with the first locking cam and precisely one second eccentric cam which is suitable for co-operation with the second locking cam, the first eccentric cam and the first locking cam being in contact with each other at a first contact location in the locked state without any external torque on the backrest, wherein, in the locked state without any external torque on the backrest, there is a gap between the second eccentric cam and the second locking cam and, in the locked state, from a specific external torque on the backrest, the second eccentric cam and the second locking cam are in contact with each other at a second contact location, wherein the first eccentric cam and the first locking cam are configured to provide at the first contact location a first wedge angle between the first eccentric cam and the first locking cam that is positive, and the second eccentric cam and the second locking cam are configured to provide at the second contact location a second wedge angle between the second eccentric cam and the second locking cam that is negative.

2. The fitting as claimed in claim 1, wherein the first eccentric cam follows in the closure direction and the second eccentric cam leads in the closure direction.

3. The fitting as claimed in claim 1, wherein the first eccentric cam leads in the closure direction and the second eccentric cam follows in the closure direction.

4. The fitting as claimed in claim 1, wherein a plurality of bars are provided.

5. The fitting as claimed in claim 4, wherein the eccentric co-operates with four bars and the eccentric for co-operation with each of the bars has precisely one first eccentric cam which is suitable for co-operation with the first locking cam, respectively, and precisely one second eccentric cam which is suitable for co-operation with the second locking cam, respectively.

6. The fitting as claimed in claim 4 wherein, of two adjacent bars, one of the two bars has a leading first eccentric cam in the closure direction and the other of the two bars has a following first eccentric cam in the closure direction.

7. The fitting as claimed in claim 4 wherein, of two radially opposing bars, one of the two bars has a leading first eccentric cam in the closure direction and the other of the two bars has a following first eccentric cam in the closure direction.

8. The fitting as claimed in claim 1, wherein at least one of the bars can tilt within a bar guide which comprises two guiding segments.

9. The fitting as claimed in claim 8, wherein the bars tilt in opposing directions with respect to the closure direction.

10. The fitting as claimed in claim 1, wherein the first wedge angle and/or the second wedge angle has/have a value smaller than 5.7°.

11. The fitting as claimed in claim 1, wherein the first wedge angle and the second wedge angle at the associated contact locations are defined as angles between the resultant force through the axis and the normal force in the closure direction.

12. The fitting as claimed in claim 1, wherein the eccentric cams and/or the locking cams are constructed in a convex manner.

13. The fitting as claimed in claim 1, wherein a control cam which is connected to the eccentric in a rotationally secure manner and which co-operates with projections of the bars in order during unlocking to bring the toothed ring and the bars out of engagement counter to the resilient loading of the eccentric.

14. The fitting as claimed in claim 1, wherein a gripping ring axially holds together the first fitting member and the second fitting member.

15. A vehicle seat having at least one fitting as claimed in claim 1.

* * * * *